United States Patent [19]

Pinter et al.

[11] 4,242,160
[45] Dec. 30, 1980

[54] METHOD OF WINDING A WIND TURBINE BLADE USING A FILAMENT REINFORCED MANDREL

[75] Inventors: Warren H. Pinter, East Hartland; Dale E. Smith, Windsor, both of Conn.

[73] Assignee: United Technologies Corporation, Hartford, Conn.

[21] Appl. No.: 9,706

[22] Filed: Feb. 2, 1979

[51] Int. Cl.³ .................... B65H 81/00; F03D 1/06
[52] U.S. Cl. .................... 156/175; 29/156.8 H; 138/156; 156/425; 416/226; 416/230; 428/398
[58] Field of Search ............ 156/172, 173, 169, 175, 156/180, 425, 182, 184, 185, 117, 188, 189, 190, 191, 156; 416/230, 226; 428/35, 36, 398; 249/175, 177; 242/7.02, 7.21, 7.22; 273/80; 64/15; 264/103; 138/156, 157, 120, 129, 130, 144; 29/156.8 R, 156.8 P, 156.8 H, 156.8 T, 156.8 B, 132

[56] References Cited

U.S. PATENT DOCUMENTS

| 2,878,038 | 3/1959 | Noland | 156/172 |
|---|---|---|---|
| 3,593,398 | 7/1971 | Hess | 29/132 |
| 3,896,858 | 7/1975 | Whatley | 428/398 |
| 4,081,220 | 3/1978 | Andrews | 416/230 |
| 4,172,175 | 10/1978 | Pearson | 156/175 |

*Primary Examiner*—Michael W. Ball
*Attorney, Agent, or Firm*—John D. Del Ponti

[57] ABSTRACT

A hollow, stiff, one-piece filament-reinforced composite mandrel of nonuniform wall thickness for a wind turbine blade spar is comprised of bonded inner and outer filament-reinforced shells. The inner shell is fabricated by bonding together separately formed tubular halves. The outer shell is built up on the outer surface of the inner shell preferably by judicious winding of a plurality of turns of filament-reinforced epoxy resin material.

6 Claims, 6 Drawing Figures

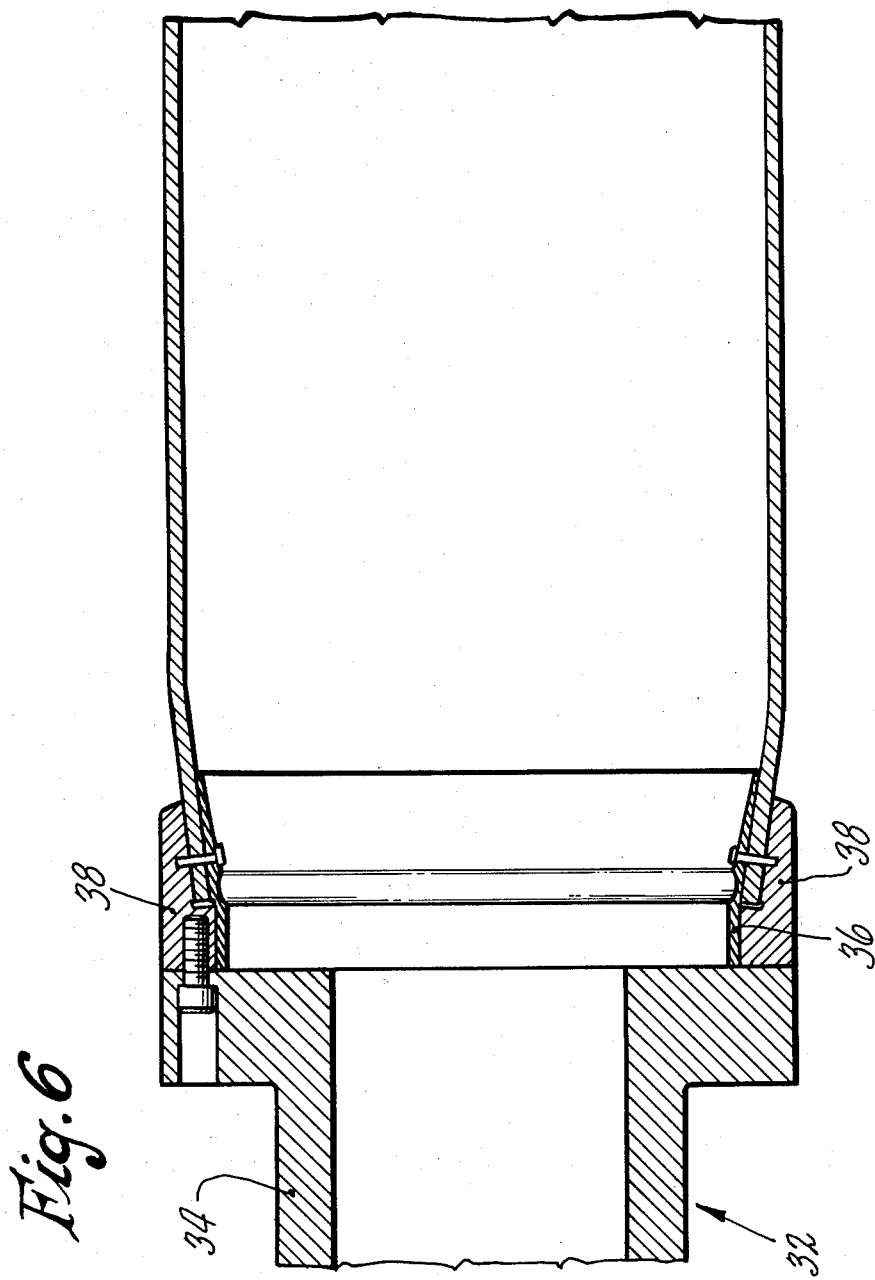

METHOD OF WINDING A WIND TURBINE BLADE USING A FILAMENT REINFORCED MANDREL

BACKGROUND OF THE INVENTION

1. Field of Invention

The present invention relates to wind turbine blades and more particularly to the production of a simple, stiff, lightweight filament-reinforced mandrel of nonuniform wall thickness for the spar of a wind turbine blade.

2. Description of the Prior Art

In the current press for new forms of energy sources, one attractive candidate has been the wind turbine. In general, a wind turbine comprises an arrangement of rotor blades, hub, pitch change mechanism, gear box, tower, generator and typically an electrical interface, all adapted to extract energy from atmospheric winds and convert it into electrical or other useful forms of energy.

The large wind turbine (100 KW and over) is characterized by its extremely long rotor blades (typically at least fifty feet long each although they may be as long as one hundred feet or more each) which are subjected to severe bending and twisting at design loadings. The rotor blades are advantageously constructed in the spar/shell configuration, with the spar being fabricated by filament winding on a mandrel, as indicated for example in U.S. Pat. No. 4,081,220 issued on Mar. 28, 1978 to Andrews and owned by assignee common to the present invention, which disclosure is incorporated herein by reference. While the nature of the spar mandrel is not discussed in detail in the aforementioned Andrews' patent, it typically consists of a central load carrying structure in the nature of a steel channel box member upon which are carried a series of separate removable sections consisting of formers, stringers and sheet metal skin which are held in place on the central box beam with keys, pins, or the like. To facilitate mandrel removal since there is considerable taper from the butt to the tip end of the spar and since the former/stringer/skin assembly is carried on the outer surface of the central box beam, the load carrying capacity at the tip of the mandrel is very low. The limitation on the thickness of the tip of the mandrel requires that it be supported primarily as a cantilevered beam with a very small portion of the weight (up to a maximum of approximately three percent) carried on a steady rest at the tip. This type of mandrel construction is extremely heavy (on the order of twenty tons for a one hundred foot blade spar) and imposes a substantial overhung moment on the headstock of the machine which supports and rotates the mandrel during winding, resulting in massive structure bearings and foundation requirements.

In addition to the weight, a mandrel constructed in several sections as heretofore described always has motions at the joints between the sections due to deflections in the structure as the mandrel rotates. These motions cause heavy wear on the mandrel sections and also result in distress in the composite material as it is being applied and cured.

SUMMARY OF THE INVENTION

It is an object of the present invention to overcome the aforementioned deficiencies of the prior art and to provide a one-piece, high strength to weight ratio, hollow filament-reinforced composite mandrel suitable for use in fabricating a wind turbine blade spar, the mandrel being in the form of a stiff cantilevered structure which is extremely simple to manufacture.

The present invention contemplates the production of a one-piece wind turbine rotor blade spar mandrel which tapers from base to tip and which comprises a hollow, cantilever structure of bonded inner and outer filament-reinforced layers and fitting means mounted on the ends of the structure for rotatably mounting the same in a blade fabricating mechanism, the mandrel being capable of carrying at its tip up to ten percent of the total of its own weight as well as the weight of the blade being fabricated thereon, and being sufficiently stiff to deflect less than one percent during blade fabrication. In one embodiment, the mandrel wall is provided with a plurality of perforations to facilitate, by passage of pressurized air, the removal of the blade spar fabricated thereon.

The invention additionally contemplates a method for making the mandrel, which method includes the steps of making longitudinal half sections, bonding the sections together to form an inner shell of the mandrel, forming an outer shell of the mandrel by applying filament-reinforced epoxy resin on the outer surface of the inner shell, and securing fitting menas to opposite ends of the inner and outer shells to adapt the mandrel for rotatable mounting on blade fabricating winding mechanism.

BRIEF DESCRIPTION OF THE DRAWINGS

An understanding of the invention will become more apparent to those skilled in the art by reference to the following detailed description when viewed in light of the accompanying drawings wherein:

FIG. 6 is a cross-sectional view of the root end of the mandrel assembly as mounted on the winding mechanism.

DESCRIPTION OF THE PREFERRED EMBODIMENT

Figure 1:
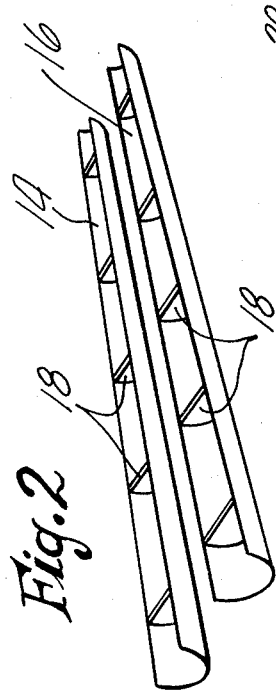
FIG. 1 is an isometric view of mandrel mold halves.
Figure 2:
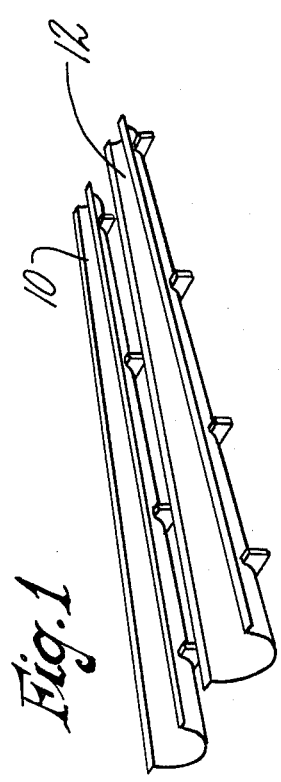
FIG. 2 is an isometric view of mandrel inner shell halves.
Figure 3:
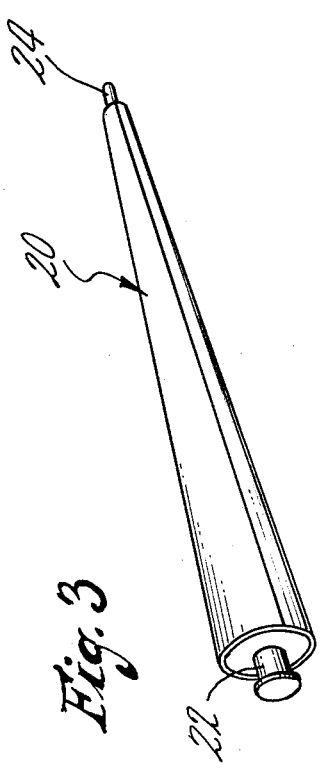
FIG. 3 is an isometric view showing the assembly of the inner shell halves.

In the drawings, FIG. 1 shows a pair of molds 10 and 12 representing longitudinally bisected halves which each form an elongated, tapered half-cylinder opening. The inner surfaces of the mold, of course, represent the desired external dimension and contour of the inner mandrel shell halves to be fabricated therein. A pair of mandrel inner shell halves 14 and 16 shown in FIG. 2 are fabricated by lay-up of sheets of filament-reinforced matrix material to the molds 10 and 12. The filament-reinforced matrix material may be selected from various available filamentary material-matrix combinations, but is preferably woven or chopped fiberglass such as high modulus, high strength S-glass, E-glass or the like in an eopxy resin so that reinforcement is provided along both the longitudinal and transverse axis of the spar mandrel. Other filamentary material such as Kevlar, boron or graphite is also suitable. To provide structural support to the shell halves 14 and 16, a plurality of lightweight ribs 18 made, for example, of styrofoam are bonded as shown and the shell halves are then assembled and bonded together to form inner shell 20 as illustrated in FIG. 3. Adaptors 22 and 24 are secured respectively to the butt and tip ends of the shell 20 to allow mounting of the shell 20 to the winding mechanism to be subsequently utilized.

Figure 4:
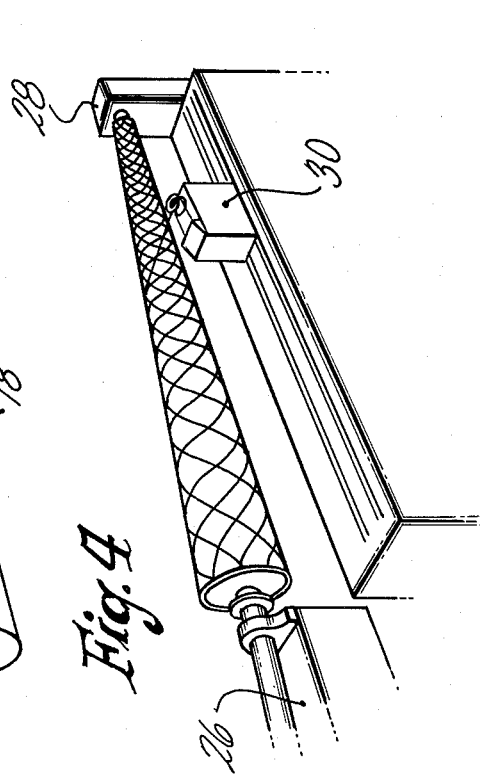
FIG. 4 is an isometric view showing the winding of the outer layer onto the inner shell.

The shell 20 is mounted for rotation about its longitudinal axis as shown in FIG. 4, on floor-mounted mechanism such as headstock 26 and tailstock 28. Adjacent the shell 20 is a filament applicator 30 which is movable in a direction parallel to the longitudinal axis of the shell 20. Although not shown, the applicator preferably contains a plurality of filament sources, a tensioner and a resin applicator and winding head means. As the shell 20 is rotated, the applicator 30 moves from the base toward the tip of the blade to provide filament-resin layers derived from overlapping helical windings. A preferred filament for this operation is the same as that utilized for the inner shell 20, i.e., a fiberglass filament of substantial modulus, such as S-glass or E-glass, or a filament made of boron, graphite, Kevlar or the like. Each filament is resin coated to form a solid outer layer of material surrounding the mandrel inner shell 20. The wound filaments are preferably precoated in the applicator 30 and generally applied as rovings of several filaments held together by the coating resin. In winding the mandrel, the successive layers of filaments are placed at selected angles to the mandrel axis and to one another to produce a maximum of bending and torsional strength. For example, successive layers oriented at 30° to the mandrel axis is in many cases the best arrangement. The filaments are wound on the inner shell in a helical form until the inner shell is completely covered with the desired number of layers of filaments of the necessary strength. Typically, the mandrel has a nonuniform wall thickness with the thickness tapering from base to tip. As will be recognized by those skilled in the art, this may be accomplished by increased layers of filaments near the base or by inserting layers of cloth or other fillers or by the use of tapered rovings.

Figure 5:
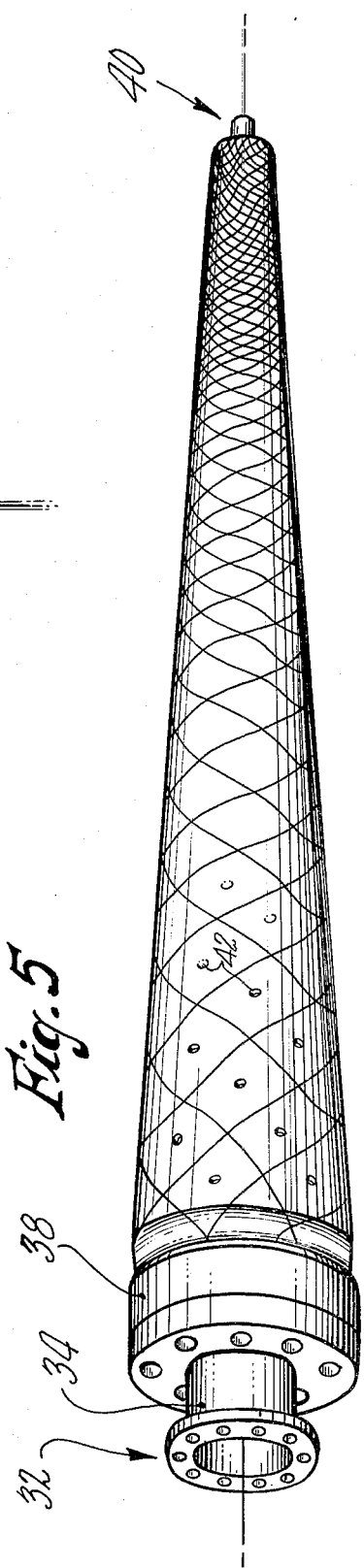
FIG. 5 is an isometric view of the finished mandrel assembly.

As shown in FIGS. 5 and 6, after winding of the shell 20 is completed, an end fitting assembly 32 comprised of a steel hub and stub shaft 34 and inner and outer rings 36 and 38 may be secured to the butt end while an identical or similar end fitting assembly 40 may be secured to the tip end. The function of the assemblies 32 and 40 is to provide a durable interface with the winding machine.

As can also be seen in FIG. 5, the mandrel may be provided with a plurality of openings 42 to allow for the use of pressurized air within the hollow mandrel in order to separate the mandrel from the spar to be subsequently wound thereover.

It will be appreciated that the inventive composite material spar mandrel has the following advantages:
(a) better use of available volume for the required structure;
(b) no joints or hard points in the mandrel to wear or cause distress in the laminates;
(c) reduced weight and increased stiffness associated with the placement of the structural material at the outer surface of the mandrel, resulting in minimum mandrel sag during blade spar and shell winding;
(d) reduction of winding machine size and cost due to minimum overhung moment on the winding machine;
(e) low basic mandrel costs;
(f) ease of duplication;
(g) reduced handling time since mandrel disassembly and reassembly not required; and
(h) longer mandrel life.

What has been set forth above is intended primarily as exemplary to enable those skilled in the art and the practice of the invention and it should therefore be understood that within the scope of the appended claims, the invention may be practiced in other ways than as specifically described. The invention is considered, for example, suitable for producing any long tapered structure similar to a wind turbine spar or blade such as a ship's mast, lighting stanchion, or the like which requires low deflection and little tip support during fabrication.

What is claimed is:

1. A method of fabricating a large wind turbine blade spar on a winding mechanism comprising:
rotatably mounting a hollow one-piece cantilever removable mandrel on said winding mechanism, said mandrel comprising a filament-reinforced resin matrix inner tubular shell having a base end and a tip end, said inner shell tapering in diameter from said base end to said tip end and comprising first and second filament-reinforced resin matrix hollow, tapered half-cylinders bonded together; a filament-reinforced resin matrix outer shell bonded to the outer surface of said inner shell, said inner and outer shells forming a tapered mandrel wall of nonuniform thickness; and fitting means on said base end and on said tip end rotatably mounting said mandrel on said winding mechanism;
winding filaments on said mandrel to form said spar; and
removing said mandrel from said winding mechanism and said spar.

2. The invention of claim 1 wherein said wall diminishes in thickness from said base end to said tip end.

3. The invention of claim 2 wherein said base end fitting means includes a pair of concentric rings clampingly secured to the base end of said wall.

4. The invention of claim 3 wherein said wall is provided with a plurality of perforations.

5. A method of manufacturing a large wind turbine blade spar on a winding mechanism comprising:
fabricating a hollow one-piece cantilever removable mandrel by a process comprising the steps of:
laying up filament-reinforced resin matrix material yto form mirrow image hollow, half-cylinders which taper in diameter along their length;
bonding said half-cylinders together to form a hollow, tapered cylindrical inner shell;
applying filament-reinforced resin matrix material to the outer surface of said inner shell to form an outer tapered cylindrical shell integrally bonded to said inner shell, said inner and outer shells forming the wall of said mandrel, said wall being of nonuniform thickness; and
securing fittings to opposite ends of said inner and outer shells to adapt said mandrel for rotatable mounting on said winding mechanism;
rotatably mounting said mandrel on said winding mechanism;
winding filaments on said mandrel to form said spar; and
removing said mandrel from said winding mechanism and said spar.

6. The invention of claim 5 wherein said mandrel wall diminishes in thickness along its tapering length.

* * * * *